United States Patent
Jurgens et al.

(10) Patent No.: US 9,639,610 B1
(45) Date of Patent: May 2, 2017

(54) METHOD FOR GAUGING PUBLIC INTEREST IN A TOPIC USING NETWORK ANALYSIS OF ONLINE DISCUSSIONS

(71) Applicant: HRL Laboratories, LLC, Malibu, CA (US)

(72) Inventors: David A. Jurgens, Montreal (CA); Tsai-Ching Lu, Wynnewood, PA (US); Veronika Stmadova, Goleta, CA (US)

(73) Assignee: HRL Laboratories, LLC, Malibu, CA (US)

( * ) Notice: Subject to any disclaimer, the term of this patent is extended or adjusted under 35 U.S.C. 154(b) by 324 days.

(21) Appl. No.: 14/452,129

(22) Filed: Aug. 5, 2014

Related U.S. Application Data
(60) Provisional application No. 61/862,467, filed on Aug. 5, 2013.

(51) Int. Cl.
G06F 17/30 (2006.01)
H04L 12/58 (2006.01)

(52) U.S. Cl.
CPC .. *G06F 17/30864* (2013.01); *G06F 17/30958* (2013.01); *H04L 51/32* (2013.01)

(58) Field of Classification Search
CPC .... G06Q 50/01; G06Q 30/02; G06Q 30/0201; G06Q 30/0643; G06Q 30/0263; G06F 17/30864; G06F 17/30958; G06F 17/30554; G06F 17/3087; H04L 51/32
USPC ........................................................ 707/741
See application file for complete search history.

(56) References Cited

U.S. PATENT DOCUMENTS

| | | | | |
|---|---|---|---|---|
| 8,982,728 | B2 * | 3/2015 | Robinson | G06Q 10/10 370/254 |
| 2003/0179742 | A1 * | 9/2003 | Ogier | H04L 1/1614 370/351 |
| 2006/0143081 | A1 * | 6/2006 | Argaiz | G06Q 30/02 705/14.53 |

(Continued)

OTHER PUBLICATIONS

Cheng, Z.; Caverlee, J.; and Lee, K. 2010. You are where you tweet: a content-based approach to geo-locating twitter users, in Proceedings of the 19th ACM international confer-ence on Information and knowledge management, 759-768. ACM.

Crane, R., and Sornette, D. 2008. Robust dynamic classes revealed by measuring the response function of a social system. Proceedings of the National Academy of Sciences 105(41):15649-15653.

Romero, D.; Meeder, B.; and Kleinberg, J. 2011, Differences in the mechanics of information diffusion across topics: idioms, political hashtags, and complex contagion on twitter. In Proceedings of the 20th international conference on World wide web, 695-704. ACM.

(Continued)

*Primary Examiner* — Thanh-Ha Dang
(74) *Attorney, Agent, or Firm* — Tope-McKay & Associates

(57) ABSTRACT

Described is system and method for gauging public interest in a topic using network analysis of online discussions. A message from an online discussion related to a specific topic is received as input. The message is analyzed for information related to the message, and a graph comprised of nodes is generated where each node represents information related to the message, such as user name, location, hyperlinks, and annotations. The graph is updated over time as additional messages from the online discussion are received. Additional nodes are generated and linked with at least one of the existing nodes in the graph to form at least one connected component. A normalized diameter of the largest connected component in the graph is determined, and a level of collective focus in the online discussion related to the topic based on the normalized diameter is output to a user.

16 Claims, 7 Drawing Sheets

(56) References Cited

U.S. PATENT DOCUMENTS

| | | | | |
|---|---|---|---|---|
| 2008/0288654 | A1* | 11/2008 | Matuszewski | H04L 29/12018 709/238 |
| 2011/0231296 | A1* | 9/2011 | Gross | G06Q 10/10 705/37 |
| 2012/0036093 | A1* | 2/2012 | Gleason | G06N 99/005 706/12 |
| 2012/0066073 | A1* | 3/2012 | Dilip | G06Q 30/0269 705/14.66 |
| 2013/0018954 | A1* | 1/2013 | Cheng | G06Q 10/00 709/204 |
| 2013/0073336 | A1* | 3/2013 | Heath | G06Q 30/02 705/7.29 |
| 2013/0198197 | A1* | 8/2013 | Sawhney | G06F 17/3087 707/741 |
| 2013/0218965 | A1* | 8/2013 | Abrol | H04L 67/22 709/204 |
| 2013/0254303 | A1* | 9/2013 | Cheng | H04L 51/32 709/206 |
| 2014/0244614 | A1* | 8/2014 | Mei | G06F 17/3064 707/708 |
| 2016/0155073 | A1* | 6/2016 | Augenstein | G06Q 10/06314 705/7.24 |

OTHER PUBLICATIONS

Ruiz, E.; Hristidis, V.; Castillo, C.; Gionis, A., and Jaimes, A. 2012. Correlating financial time series with micro-blogging activity. In WSDM'12.

Veronika Stmadova, David Jurgens, and Tsai-Ching Lu, "Characterizing Online Discussions in Microblogs Using Network Analysis," Analyzing Microtext: Papers from the 2013 Association for the Advancement of Artificial Intelligence (AAAI) Spring Symposium, vol. SS-13-01.

Brin, S.and Page, L. 1998. "The anatomy of a large-scale hypertextual Web search engine". Computer Networks and ISDN Systems 30: 107-117.

De Choudhury, M.; Counts, S.; and Czerwinski, M. 2011. Identifying relevant social media content: leveraging information diversity and user cognition. In Proceedings of the 22nd ACM conference on Hypertext and hypermedia, 161-170. ACM.

Lee, R.; Wakamiya, S.; and Sumiya, K. 2011. Discovery of unusual regional social activities using geo-tagged microblogs. World Wide Web 14(4):321-349.

Shamma, D.; Kennedy, L.; and Churchill, E. 2010. Tweetgeist: Can the twitter timeline reveal the structure of broad-cast events? In CSCW 2010.

* cited by examiner

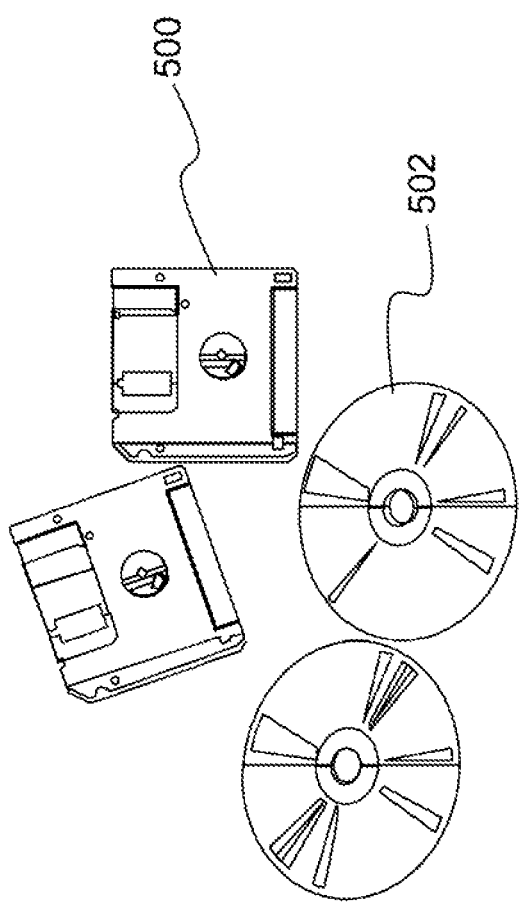

METHOD FOR GAUGING PUBLIC INTEREST IN A TOPIC USING NETWORK ANALYSIS OF ONLINE DISCUSSIONS

GOVERNMENT LICENSE RIGHTS

This invention was made with government support under U.S. Government Contract Number DI2PC00285 Open Source Indicators. The government has certain rights in the invention.

CROSS-REFERENCE TO RELATED APPLICATIONS

This is a Non-Provisional application of U.S. Provisional Application No. 61/862,467, filed on Aug. 5, 2013, entitled, "A Method for Gauging Public Interest in a Topic Using Network Analysis of Online Discussions."

BACKGROUND OF THE INVENTION (1) Field of Invention

The present invention relates to a system for gauging public interest in a topic and, more particularly, to a system for gauging public interest in a topic using network analysis of online discussions.

(2) Description of Related Art

The large scale of microblogging activity has given rise to free-form discussions in which participants may join and leave at any time. Furthermore, for a given topic many factors, such as news stories or region-specific interest, may drive new users to participate in a discussion. Measuring public interest in a topic through its online discussions in microblogs can be difficult due to the sheer scale of microblog data (e.g., an estimated 100 million new posts per day to Twitter™), as well as the variety of language used in the discussion. Furthermore, the frequency with which topical messages are posted is not necessarily an accurate gauge of interest due to the non-uniformity of users where some users will post significantly more messages and over-represent a frequency-based sample.

Crane and Sornette propose a statistical model of online viewing that identifies three classes of user behavior for predicting viewing trends in YouTube™, as described in "Robust Dynamic Classes Revealed by Measuring the Response Function of a Social System" in Proceedings of the National Academy of Sciences 105(41):15649-15653 (hereby incorporated by reference as though fully set forth herein). Their model only uses viewing counts in measuring interest. However, when applied to online discussions instead of YouTube™ videos, this method would ignore the topical content in the discussion as well as the relationships between the participants and their locations, all of which reveal the degree of topical focus the discussion has around a core set of entities.

Romero, Meeder, and Kleinberg analyzed the growth and persistence of hashtags in different topic categories, demonstrating that the emergence of a popular hashtag is highly topic dependent in "Differences in the Mechanics of Information Diffusion Across Topics: Idioms, Political Hashtags, and Complex Contagion on Twitter in Proceedings of the 20th International Conference on World Wide Web, 695-704, ACM. 2011 (hereby incorporated by reference as though fully set forth herein). This method could be used to measure interest by modeling the spreading of a hashtag throughout a discussion's content. However, it does not take users or locations into account, nor does it consider the relatedness between multiple hashtags within a single discussion.

Ruiz et al. proposed a similar method for constructing networks from Twitter™ message about a publically traded company and demonstrated how the properties of this network could be used to predict stock price changes, as described in "Correlating Financial Time Series with Micro-Blogging Activity in WSDM, 2012 (hereby incorporated by reference as though fully set forth herein). Their network representation does not consider the location of the users, which is important in identifying geographically-local discussions.

The representation of discussions as interconnected networks of entities has not been previously considered. Existing processes for measuring importance have largely relied on frequency-based analysis or on identifying important users and analyzing their content. Thus, a continuing need exists for a method that relies upon the interrelatedness of all of a discussion's entities as a way of assessing how focused the discussion is on a key set of topics in order to characterize collective focus.

SUMMARY OF THE INVENTION

The present invention relates to a system for gauging public interest in a topic and, more particularly, to a system for gauging public interest in a topic using network analysis of online discussions. The system comprises one or more processors and a memory having instructions such that when the instructions are executed, the one or more processors perform multiple operations. A message from an online discussion related to a topic is received as input. The message is analyzed for information related to the message. A graph comprising a plurality of nodes is then generated, wherein each of the plurality of nodes represents information related to the message. The graph is updated over time as additional messages from the online discussion are received. Additional nodes are generated and linked with the plurality of nodes in the graph to form at least one connected component comprising a set of nodes that are linked together by paths. A normalized diameter of the largest connected component in the graph is determined, wherein the diameter of a connected component is the length of the longest path between two nodes in the connected component. Finally, a level of collective focus in the online discussion related to the topic based on the normalized diameter is output to a user.

In another aspect, the system determines the normalized diameter according to the following:

$$\frac{\max_{u,v} d(u, v)}{n_{L(G)}}$$

where $\max_{u,v} d(u, v)$ represents a value of the diameter in the largest connected component, and $n_{L(G)}$ is the number of nodes in the largest connected component of a graph G.

In another aspect, the level of collective focus is related to the normalized diameter such that if the normalized diameter decreases, then the level of collective focus increases, and if the normalized diameter increases, then the level of collective focus decreases.

In another aspect, the information related to the message is selected from a group consisting of user information, location information, hyperlink information, and annotation information.

In another aspect, the location information is obtained from at least one of geo-coordinate information related to the message or location information in a user profile from the online discussion.

In another aspect, the present invention comprises a system for gauging public interest in a new consumer product using network analysis of online discussions. The system comprises one or more processors and a memory having instructions such that when the instructions are executed, the one or more processors perform multiple operations. A message from an online discussion related to a topic is received as input. The message is analyzed for information related to the message. A graph comprising a plurality of nodes is then generated, wherein each of the plurality of nodes represents information related to the message. The graph is updated over time as additional messages from the online discussion are received. Additional nodes are generated and linked with the plurality of nodes in the graph to form at least one connected component comprising a set of nodes that are linked together by paths. A normalized diameter of the largest connected component in the graph is determined, wherein the diameter of a connected component is the length of the longest path between two nodes in the connected component. A level of collective focus in the online discussion related to the topic based on the normalized diameter is output. The user monitors an online discussion among consumers related to a new consumer product and uses the level of collective focus to estimate how interested the set of consumers are in the new consumer product.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 5 is an illustration of a computer program product according to the principles of the present invention.

DETAILED DESCRIPTION

Figure 1:
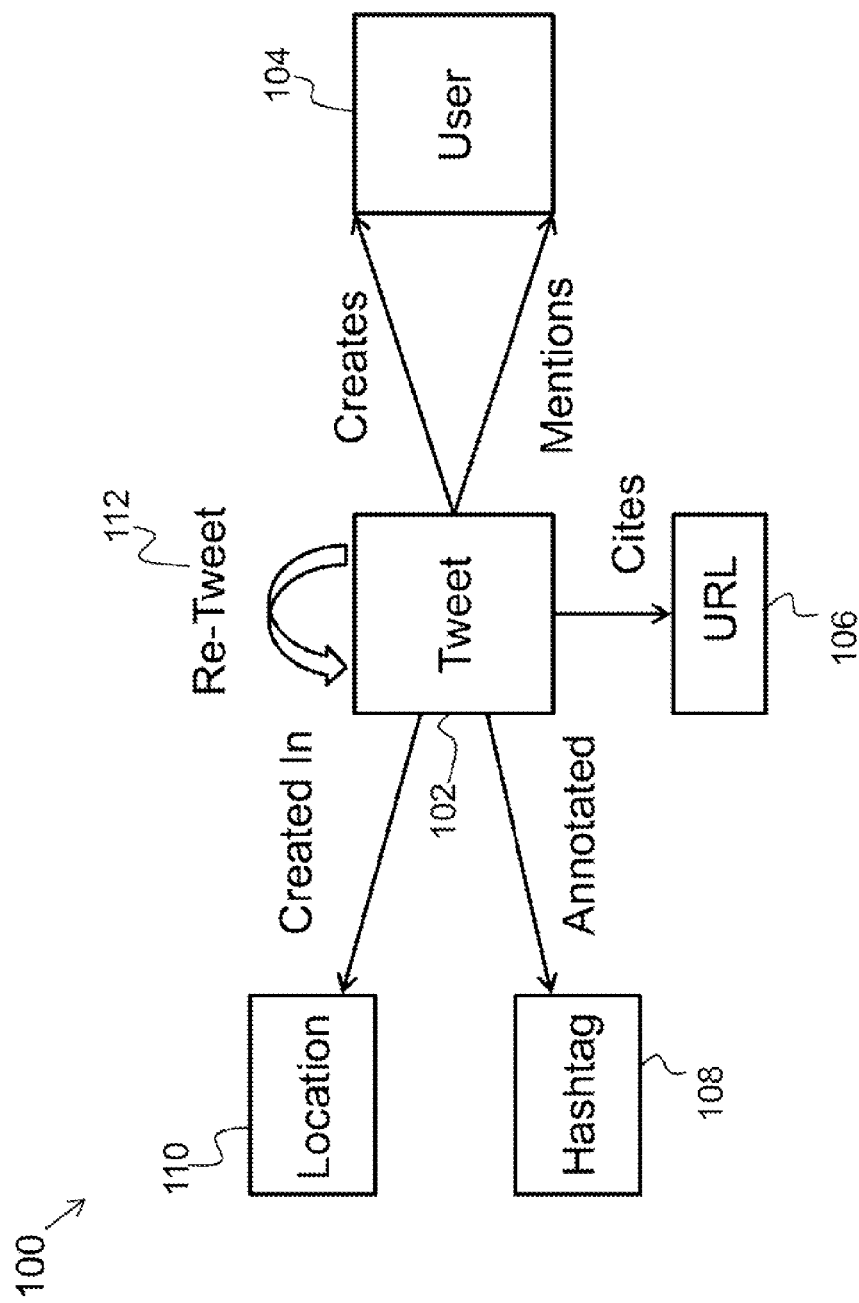
FIG. 1 is an illustration of a discussion network according to the principles of the present invention.

The present invention relates to a system for gauging public interest in a topic and, more particularly, to a system for gauging public interest in a topic using network analysis of online discussions. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, a description of various principal aspects of the present invention is provided. Subsequently, specific details of the present invention are provided to give an understanding of the specific aspects.

(1) Principal Aspects

The present invention has three "principal" aspects. The first is a system for gauging public interest in a topic through analysis of online discussions. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for gauging public interest in a topic through analysis of online discussions. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e., computer operations coded into a computer chip). The "instructions" may be stored on any non-transitory computer-readable medium such as a floppy disk, a CD-ROM, a flash drive, and in the memory of a computer.

(2) Specific Details

Described is a system for measuring the level of collective focus and interest in the discussion of a specific topic using a graph methodology to represent the overarching discussion of a topic in microblogs as a graph with interconnected users, topics, locations, hashtags, and hyperlinks. The system then analyzes the normalized diameter of the largest component in the graph as a way of measuring how focused the discussion is on a core set of topical entities. Furthermore, the system described herein enables real-time monitoring of the level of interest in a topic and is language independent.

The system according to the principles of the present invention takes a stream of textual messages, such as Twitter™ messages ("Tweets™"), about a specific topic and produces a network, which is then measured using a normalized diameter to estimate the collective focus of the participants around a set of keywords. References to Tweets™ and Twitter™ are used as a non-limiting example of textual messages between users of a social network. Thus, references to Tweets™ and Twitter™ are used only for illustrative purposes, and the present invention is not intended to be limited thereto.

FIG. 1 illustrates an example schema used to construct a network from individual Tweets™. As shown in FIG. 1, a network 100 is constructed in which individual Tweets™ 102 link to four other node types: users 104, hyperlinks (URL 106), hashtags 108, and locations 110. The users 104 node provides information related to who created and/or mentioned the Tweets™ 102. The URL 106 node provides information related to where the Tweets™ 102 is cited. The hashtags 108 node provides information related to how the Tweet™ 102 is annotated. A hashtag is a word or phrase preceded by a hash or pound sign (#) and used to identify messages on a specific topic. The locations 110 node provides information related to the location of the Tweet™ 102. As can be appreciated by one skilled in the art, the node types that are used in construction of the network need not be limited to those described above.

As new Tweets™ are added to the network 100, nodes are generated based on the Tweets™ content and are linked with existing nodes in the discussion. As the online discussion grows, the network 100 grows more connected to elements that are shared in common between many Tweets™ 102. For example, a viral news story would generate a graph with many Tweets™ 102 pointing to the same hyperlink (URL 106), and possibly to a Tweets™ 102 that was shared multiple times (i.e., retweet 112), whereas a discussion from a single city would have many Tweets™ 102 linked to the same location 110. Importantly, this network 100 representation of an online discussion enables modeling of shared relations between the features.

For associating Tweets™ with locations, a two-step process is used. First, approximately 1% of all Tweets™ come with geo-coordinates, which allows one to accurately recover the location at which a Tweets™ originated. For instance, the Google™ Maps Reverse Geocoding service (developed by Google™, located at 1600 Amphitheatre Parkway Mountain View, Calif. 94043) can be used to convert geo-coordinates into a canonical city-level location name. Second, when geo-coordinates are not available, a method which looks into a user's profile for a location and uses that as the location of the tweeted message can be followed, as described by Cheng, Caverlee, and Lee in "You are Where You Tweet: a Content-Based Approach to Geo-Locating Twitter Users" in Proceedings of the 19th ACM International Conference on Information and Knowledge Management, 759-768. ACM, 2010, which is hereby incorporated by reference as though fully set forth herein.

Location names from user profiles were further normalized to the same set of city labels. Furthermore, using the Tweets™ with geo-coordinates as ground truth, the standard errors for profile-based location names were calculated, and those names with a median error above 25 kilometers were removed, ensuring a higher precision at the expense of recall. Ultimately, in experimental studies, approximately 32% of all messages were linked with a location.

The diameter of a connected component measures the length of the longest shortest path between any two vertices (or nodes) in that component, a feature which is not accessible using a frequency-based analysis. A connected component is a set of connected nodes (i.e., a path between any pair of nodes). For each pair of nodes in a connected component, the shortest path connecting the two nodes is found. Then, among all of the shortest paths, the longest one is used as the diameter. It was hypothesized that if a conversation is highly concentrated around a few entities, then it is likely that the diameter of the largest component will be small relative to the component size (i.e., most Tweets™ have short connections to the most central entities). The component size is the number of nodes in a component.

For instance, if there are six entities (nodes): A, B, C, D, E, and F In a graph 1, there are the following edge sets: {A-B, B-D, C-D, E--F}. In a graph 2, there are the following edge sets: {A-B, B-C, B-D, C-D, E--F}. There are two connected components (C) in each graph as follows:

Graph 1: C1={A-B, B-D, C-D};C2={E-F}

Graph 2: C1={A-B, B-C, B-D, C-D};C2={E-F}

Therefore, the largest component in both cases is C1 with component size 4 (number of nodes); however, the diameters are different. The diameter of C1 in Graph 1 is 3, and the diameter of C1 in Graph 2 is 2. Thus, the measure of the normalized diameter for Graph 1 is ¾, and the measure of the normalized diameter for Graph 2 is 2/4.

Conversely, if a discussion is unfocused with many unrelated entities, then the diameter of the largest component will increase. Additionally, because the total volume of discussion (i.e., number of Tweets™) varies per day, the diameter was normalized by the total graph size (i.e., the number of vertices), which enables a more fair comparison of the diameter between days. The term "normalized diameter" is used to refer to the value:

$$\frac{\max_{u,v} d(u, v)}{n_{L(G)}}$$

where $\max_{u,v} d(u, v)$ is the value of the diameter in the largest connected component, and $n_{L(G)}$ is the number of vertices in the largest connected component of graph G.

Figure 2:
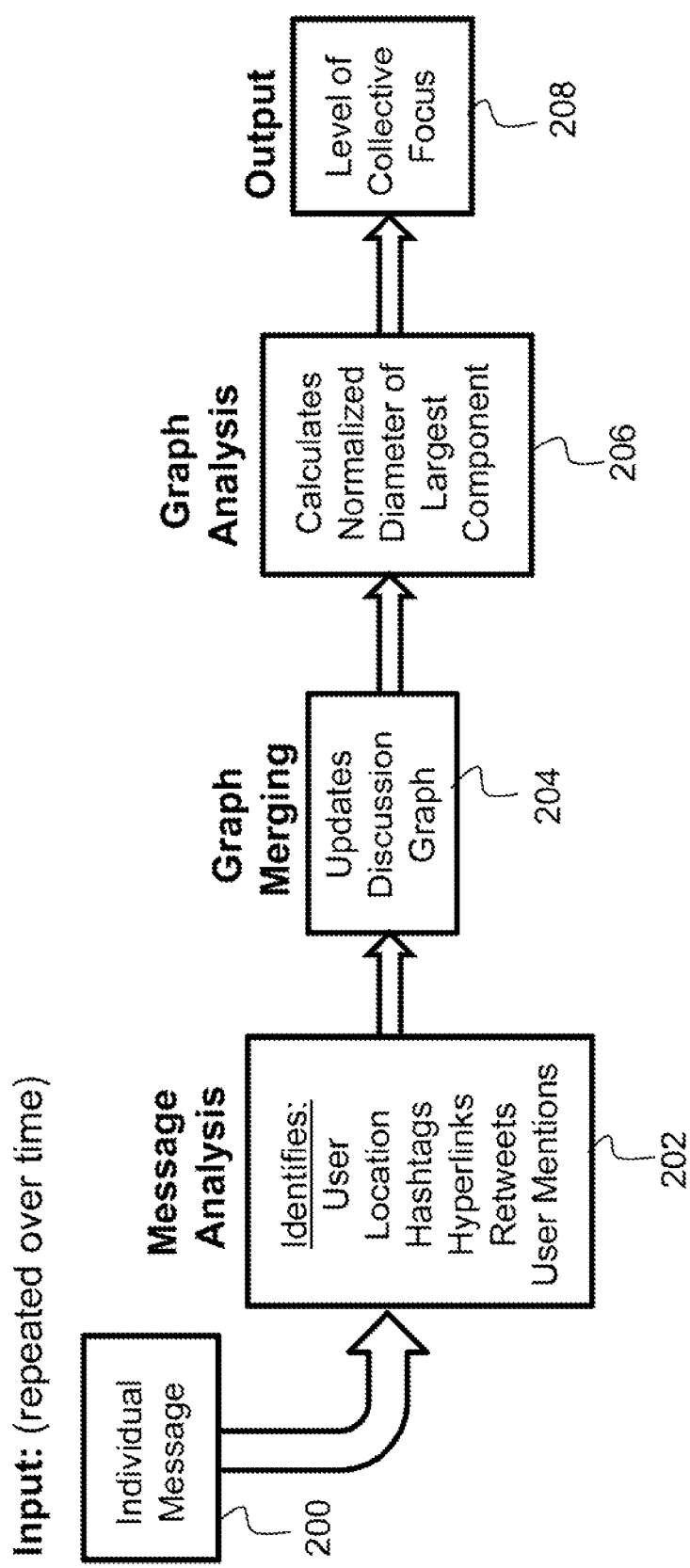
FIG. 2 is a flow diagram illustrating how new messages are processed according to the principles of present invention.

FIG. 2 is a flow diagram illustrating the process flow of the system according to the principles of the present invention. First, an individual message 200 (e.g., Tweets™) is received as input. This step is repeated over time as additional individual messages 200 come in during a discussion. In a message analysis step 202, the system identifies information related to the individual message 200. Non-limiting examples of related information include user, location, hashtags, hyperlinks, retweets, and user mentions. In a graph merging step 204, the discussion network/graph is constructed (for a first individual message) or updated as described above. In a graph analysis step 206, the normalized diameter of the largest component is calculated. Finally, in an output step 208, the level of collective focus, which is the inverse of the value of the normalized diameter value, is output.

Figure 3A:
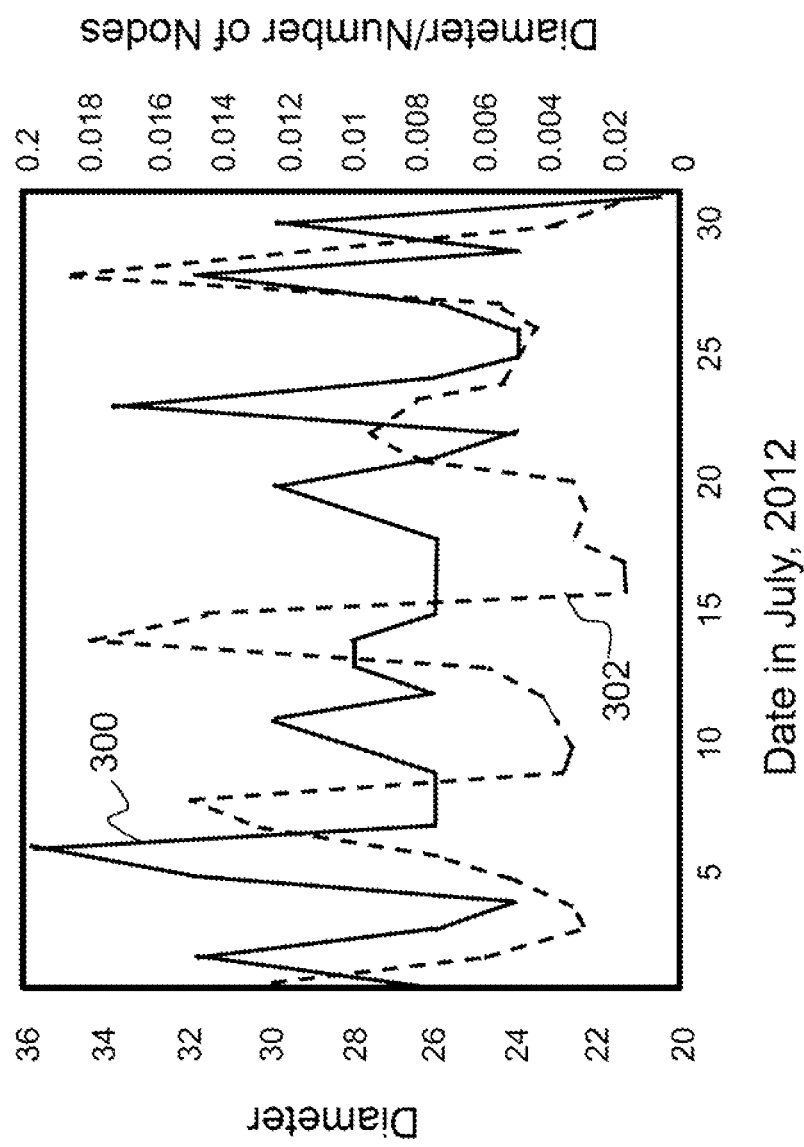
FIG. 3A is a plot comparing changes in diameter and normalized diameter for graphs built for Tweets™ having Microsoft® as a keyword according to the principles of the present invention.
Figure 3B:
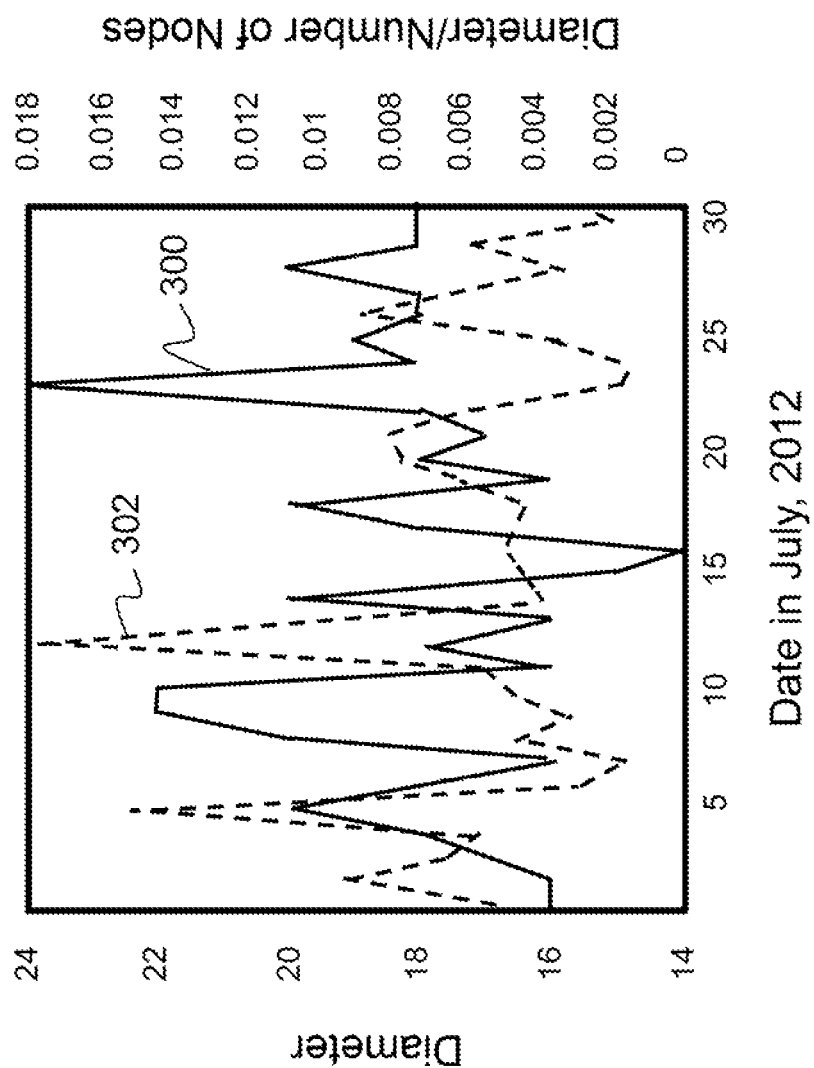
FIG. 3B is a plot comparing changes in diameter and normalized diameter for graphs built for Tweets™ having Yankees as a keyword according to the principles of the present invention.
Figure 3C:
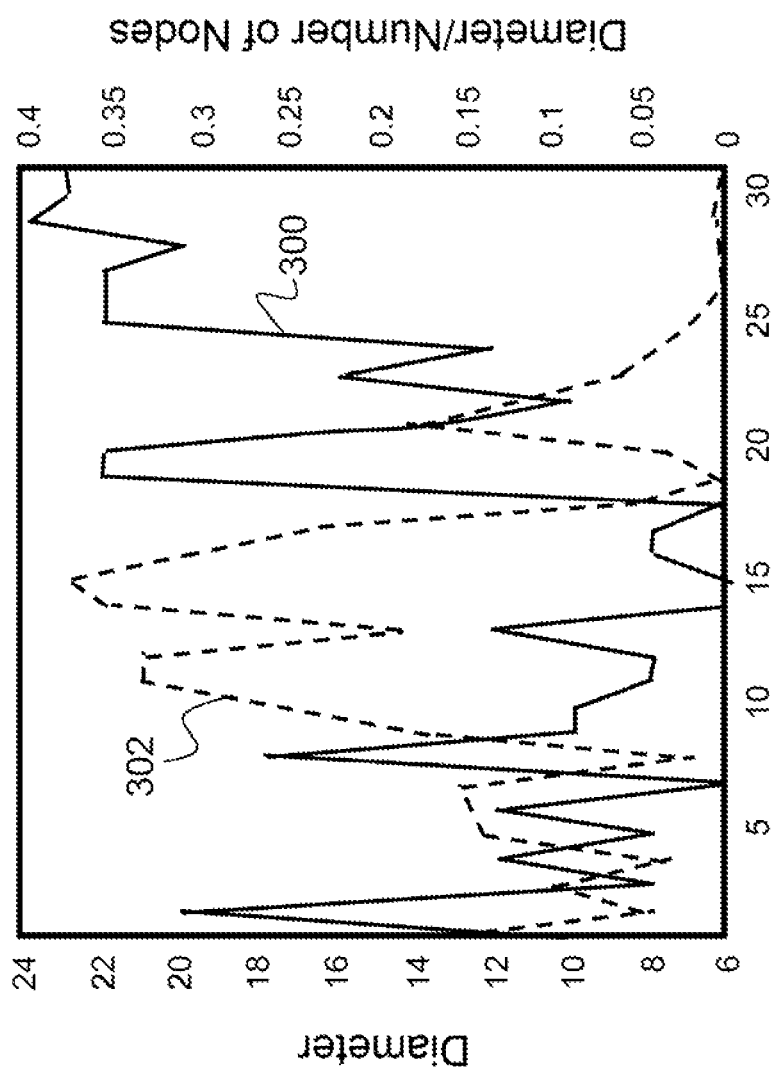
FIG. 3C is a plot comparing changes in diameter and normalized diameter for graphs built for Tweets™ having Great Britain as a keyword according to the principles of the present invention.

To validate the approach, the method according to the principles of the present invention was tested on multiple discussion keywords, and the changes in normalized diameter for graphs built for a day's worth of Tweets™ in July of 2012 were analyzed. FIGS. 3A-3C illustrate examples of the changes in diameter and normalized diameter for three of the graphs over the month, including Tweets™ related to Microsoft® (FIG. 3A), Yankees (FIG. 3B), and Great Britain (FIG. 3C). In each of the plots in FIGS. 3A-3C, a solid line 300 represents changes in diameter, and a dashed line 302 represents changes in normalized diameter.

The normalized diameter (dashed line, element 302) shows clear patterns that correspond to real-world phenomena affecting user behavior. Despite being very different keywords (i.e., Microsoft®. Yankees, and Great Britain), all three plots shown in FIGS. 3A-3C show changes in the normalized diameter (dashed line, element 302) that correspond to a concentrated discussion. For instance, the spikes in normalized diameter (dashed line, element 302) in FIG. 3A correspond to weekends, during which time the discussion around Microsoft® varies significantly. In contrast, during the week, the discussion is more focused on news stories about the company.

In FIG. 3B, the spikes in normalized diameter (dashed line, element 302) correspond to days when the Yankees do not have games. The discussions become more focused (i.e., have a lower normalized diameter (dashed line, element 302)) on game days when the topics are focused around a core set of individuals, locations (i.e., where they play), and hyperlinks about that day's game. In comparison, the sharp drop in FIG. 3C corresponds to the start of the Olympic Games, where a high percentage of the discussion for Great Britain is focused around that country's involvement in the Olympic Games or in hosting the Olympic Games. Here, much of the discussion centers on a few key hashtags and individuals to which most participants are connected, thereby significantly lowering the normalized diameter. Thus, spikes in the normalized diameter (dashed line, element 302) show a decentralization of the discussion around a topic that corresponds to real-world phenomena Importantly, it was noted that the graphs do not display any changes in the unnormalized diameter (solid line, element 300) that corresponded to changes in user behavior. Similarly, the frequencies with which the keywords are mentioned (not shown) does not follow any trend that could be matched against these real-world phenomena.

The invention described herein can be applied to any system that needs to identify measures that capture collective behavior for prediction. Additionally, the present invention has applications for programs that require tracking public interest in a topic. For instance, a company could monitor the online discussions around a new consumer product line to estimate how interested users/consumers are in the product line.

Figure 4:
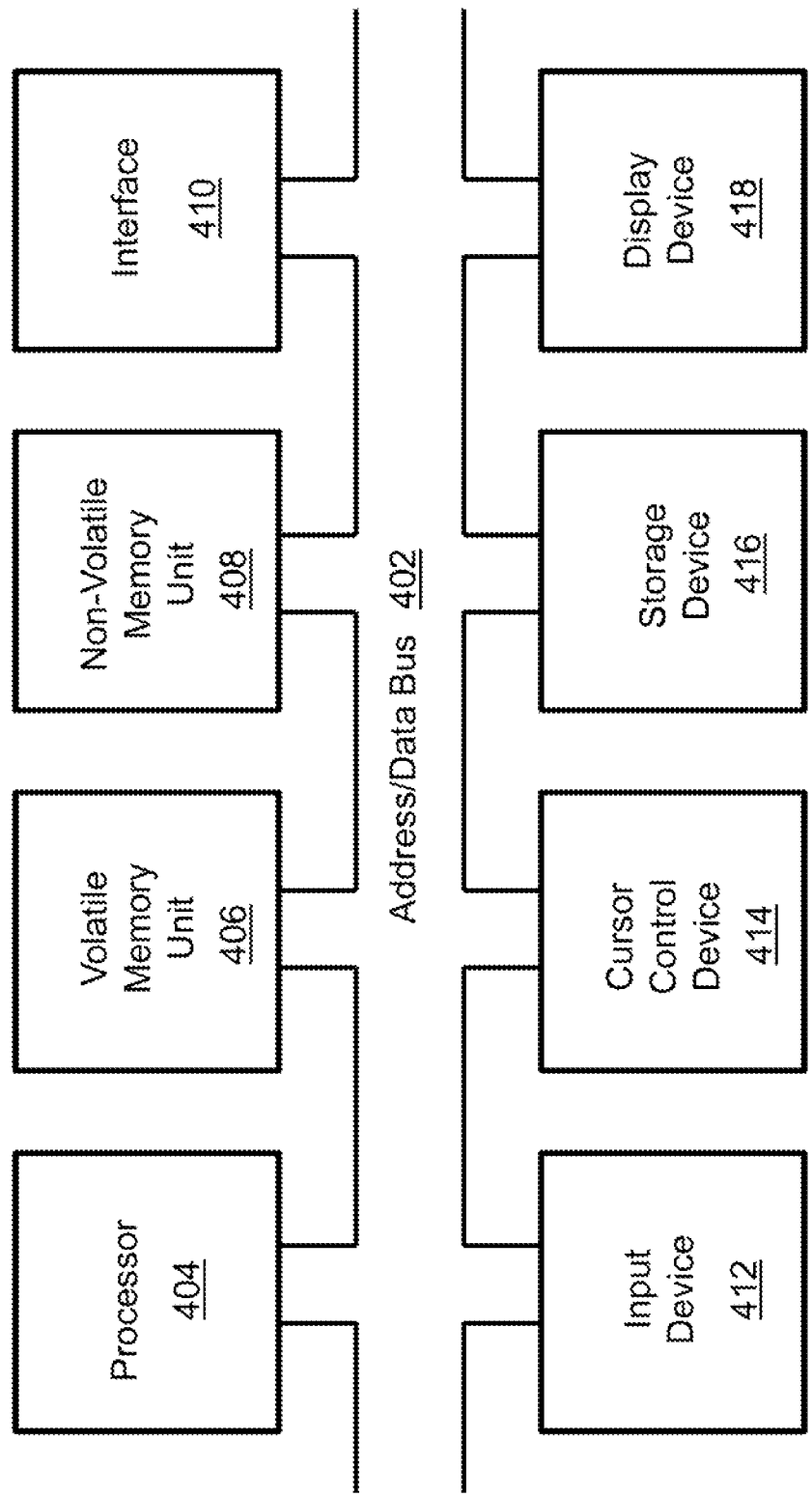
FIG. 4 is an illustration of a data processing system according to the principles of the present invention.

An example of a computer system 400 in accordance with one aspect is shown in FIG. 4. The computer system 400 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 400. When executed, the instructions cause the computer system 400 to perform specific actions and exhibit specific behavior, such as described herein.

The computer system 400 may include an address/data bus 402 that is configured to communicate information. Additionally, one or more data processing units, such as a processor 404, are coupled with the address/data bus 402. The processor 404 is configured to process information and instructions. In one aspect, the processor 404 is a microprocessor. Alternatively, the processor 404 may be a different type of processor such as a parallel processor, or a field programmable gate array. The computer system 400 is configured to utilize one or more data storage units. The computer system 400 may include a volatile memory unit 406 (e.g., random access memory ("RAM"), static RAM, dynamic RAM, etc.) coupled with the address/data bus 402, wherein a volatile memory unit 406 is configured to store information and instructions for the processor 404. The computer system 400 further may include a non-volatile memory unit 408 (e.g., read-only memory ("ROM"), programmable ROM ("PROM"), erasable programmable ROM ("EPROM"), electrically erasable programmable ROM ("EEPROM"), flash memory, etc.) coupled with the address/data bus 402, wherein the non-volatile memory unit 408 is configured to store static information and instructions for the processor 404. Alternatively, the computer system 400 may execute instructions retrieved from an online data storage unit such as in "Cloud" computing. In an embodiment, the computer system 400 also may include one or more interfaces, such as an interface 410, coupled with the address/data bus 402. The one or more interfaces are configured to enable the computer system 400 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 400 may include an input device 412 coupled with the address/data bus 402, wherein the input device 412 is configured to communicate information and command selections to the processor 400. In accordance with one aspect, the input device 412 is an alphanumeric input device, such as a keyboard, that may include alphanumeric and/or function keys. Alternatively, the input device 412 may be an input device other than an alphanumeric input device. In one aspect, the computer system 400 may include a cursor control device 414 coupled with the address/data bus 402, wherein the cursor control device 414 is configured to communicate user input information and/or command selections to the processor 400. In one aspect, the cursor control device 414 is implemented using a device such as a mouse, a track-ball, a track-pad, an optical tracking device, or a touch screen. The foregoing notwithstanding, in one aspect, the cursor control device 414 is directed and/or activated via input from the input device 412, such as in response to the use of special keys and key sequence commands associated with the input device 412. In an alternative aspect, the cursor control device 414 is configured to be directed or guided by voice commands.

In one aspect, the computer system 400 further may include one or more optional computer usable data storage devices, such as a storage device 416, coupled with the address/data bus 402. The storage device 416 is configured to store information and/or computer executable instructions. In one aspect, the storage device 416 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 418 is coupled with the address/data bus 402, wherein the display device 418 is configured to display video and/or graphics. In one aspect, the display device 418 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 400 presented herein is an example computing environment in accordance with one aspect. However, the non-limiting example of the computer system 400 is not strictly limited to being a computer system. For example, one aspect provides that the computer system 400 represents a type of data processing analysis that may be used in accordance with various aspects described herein. Moreover, other computing systems may also be implemented. Indeed, the spirit and scope of the present technology is not limited to any single data processing environment. Thus, in one aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, one aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

An illustrative diagram of a computer program product embodying an aspect of the present invention is depicted in FIG. 5. As a non-limiting example, the computer program product is depicted as either a floppy disk 500 or an optical disk 502. However, as mentioned previously, the computer program product generally represents computer readable code (i.e., instruction means or instructions) stored on any compatible non-transitory computer readable medium.

What is claimed is:

1. A system for gauging public interest in a topic using network analysis of online discussions, the system comprising:
one or more processors and a non-transitory memory having instructions encoded thereon such that when the instructions are executed, the one or more processors perform operations of:
receiving, as input, a message from an online discussion related to a topic;
analyzing the message for information related to the message;
generating a graph comprising a plurality of nodes, wherein each of the plurality of nodes represents information related to the message;
updating the graph over time as additional messages from the online discussion are received, such that additional nodes are generated and linked with at least one of the plurality of nodes in the graph to form at least one connected component comprising a set of nodes that are linked together by paths;
determining a normalized diameter of the largest connected component in the graph, wherein the diameter of a connected component is the length of the longest path between two nodes in the connected component; and
outputting a level of collective focus in the online discussion related to the topic based on the normalized diameter to a user.

2. The system as set forth in claim 1, wherein the one or more processors further perform an operation of determining the normalized diameter according to the following:

$$\frac{\max_{u,v} d(u, v)}{n_{L(G)}}$$

where $\max_{u,v} d(u, v)$ represents a value of the diameter in the largest connected component, and $n_{L(G)}$ is the number of nodes in the largest connected component of a graph G.

3. The system as set forth in claim 2, wherein the level of collective focus is related to the normalized diameter such that if the normalized diameter decreases, then the level of collective focus increases, and if the normalized diameter increases, then the level of collective focus decreases.

4. The system as set forth in claim 3, wherein the information related to the message is selected from a group consisting of user information, location information, hyperlink information, and annotation information.

5. The system as set forth in claim 4, wherein the location information is obtained from at least one of geo-coordinate information related to the message or location information in a user profile from the online discussion.

6. A computer-implemented method for gauging public interest in a topic using network analysis of online discussions, comprising:
an act of causing one or more processors to execute instructions stored on a non-transitory memory such that upon execution, the data processor performs operations of:
receiving, as input, a message from an online discussion related to a topic;
analyzing the message for information related to the message;

generating a graph comprising a plurality of nodes, wherein each of the plurality of nodes represents information related to the message;

updating the graph over time as additional messages from the online discussion are received, such that additional nodes are generated and linked with at least one of the plurality of nodes in the graph to form at least one connected component comprising a set of nodes that are linked together by paths;

determining a normalized diameter of the largest connected component in the graph, wherein the diameter of a connected component is the length of the longest path between two nodes in the connected component; and outputting a level of collective focus in the online discussion related to the topic based on the normalized diameter to a user.

7. The method as set forth in claim 6, wherein the one or more processors further perform an operation of determining the normalized diameter according to the following:

$$\frac{\max_{u,v} d(u, v)}{n_{L(G)}}$$

where $\max_{u,v} d(u, v)$ represents a value of the diameter in the largest connected component, and $n_{L(G)}$ is the number of nodes in the largest connected component of a graph G.

8. The method as set forth in claim 7, wherein the level of collective focus is related to the normalized diameter such that if the normalized diameter decreases, then the level of collective focus increases, and if the normalized diameter increases, then the level of collective focus decreases.

9. The method as set forth in claim 8, wherein the information related to the message is selected from a group consisting of user information, location information, hyperlink information, and annotation information.

10. The method as set forth in claim 9, wherein the location information is obtained from at least one of geo-coordinate information related to the message or location information in a user profile from the online discussion.

11. A computer program product for gauging public interest in a topic using network analysis of online discussions, the computer program product comprising computer-readable instructions stored on a non-transitory computer-readable medium that are executable by a computer having a processor for causing the processor to perform operations of:

receiving, as input, a message from an online discussion related to a topic;

analyzing the message for information related to the message;

generating a graph comprising a plurality of nodes, wherein each of the plurality of nodes represents information related to the message;

updating the graph over time as additional messages from the online discussion are received, such that additional nodes are generated and linked with at least one of the plurality of nodes in the graph to form at least one connected component comprising a set of nodes that are linked together by paths;

determining a normalized diameter of the largest connected component in the graph, wherein the diameter of a connected component is the length of the longest path between two nodes in the connected component; and outputting a level of collective focus in the online discussion related to the topic based on the normalized diameter to a user.

12. The computer program product as set forth in claim 11, further comprising instructions for causing the processor to perform an operation of determining the normalized diameter according to the following:

$$\frac{\max_{u,v} d(u, v)}{n_{L(G)}}$$

where $\max_{u,v} d(u, v)$ represents a value of the diameter in the largest connected component, and $n_{L(G)}$ is the number of nodes in the largest connected component of a graph G.

13. The computer program product as set forth in claim 12, wherein the level of collective focus is related to the normalized diameter such that if the normalized diameter decreases, then the level of collective focus increases, and if the normalized diameter increases, then the level of collective focus decreases.

14. The computer program product as set forth in claim 13, wherein the information related to the message is selected from a group consisting of user information, location information, hyperlink information, and annotation information.

15. The computer program product as set forth in claim 14, wherein the location information is obtained from at least one of geo-coordinate information related to the message or location information in a user profile from the online discussion.

16. A system for gauging public interest in a new consumer product using network analysis of online discussions, the system comprising:

one or more processors and a non-transitory memory having instructions encoded thereon such that when the instructions are executed, the one or more processors perform operations of:

receiving, as input, a message from an online discussion related to a topic;

analyzing the message for information related to the message;

generating a graph comprising a plurality of nodes, wherein each of the plurality of nodes represents information related to the message;

updating the graph over time as additional messages from the online discussion are received, such that additional nodes are generated and linked with at least one of the plurality of nodes in the graph to form at least one connected component comprising a set of nodes that are linked together by paths;

determining a normalized diameter of the largest connected component in the graph, wherein the diameter of a connected component is the length of the longest path between two nodes in the connected component;

outputting a level of collective focus in the online discussion related to the topic based on the normalized diameter to a user;

wherein the user monitors an online discussion among consumers related to a new consumer product and uses the level of collective focus to estimate how interested the set of consumers are in the new consumer product.

* * * * *